Jan. 22, 1929.     R. A. SMITH     1,700,100
BUSHING
Original Filed Sept. 18, 1925
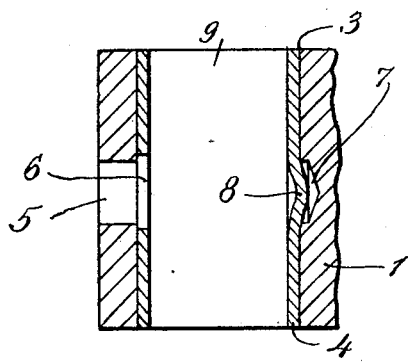
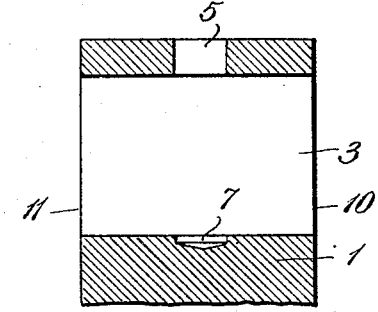
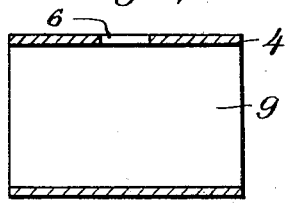
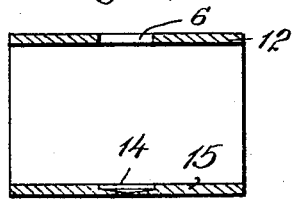
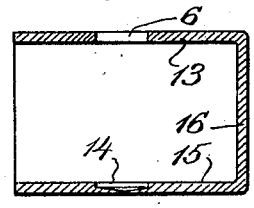
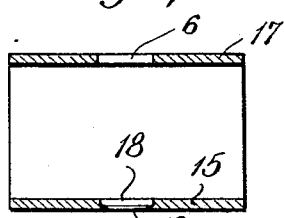
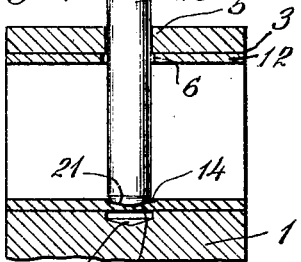
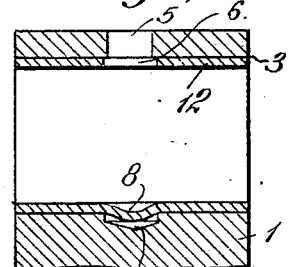
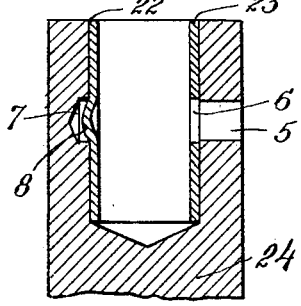
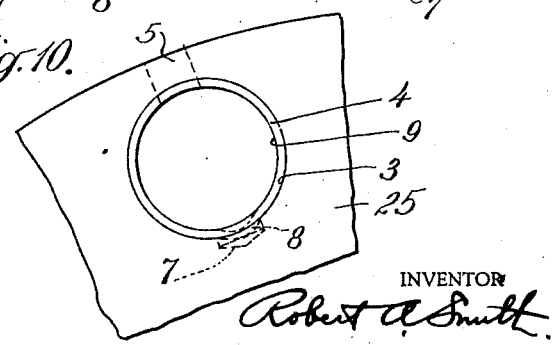
INVENTOR
Robert A. Smith Patented Jan. 22, 1929.

1,700,100

UNITED STATES PATENT OFFICE.

ROBERT A. SMITH, MAHWAH, NEW JERSEY, ASSIGNOR TO SMITH & SERRELL, A COPARTNERSHIP CONSISTING OF JOHN J. SERRELL AND HIMSELF, OF ELIZABETH, NEW JERSEY.

BUSHING.

Original application filed September 18, 1925, Serial No. 57,088. Divided and this application filed November 28, 1927. Serial No. 236,203.

The invention in this case, which is a division of my co-pending application Serial No. 57,088, filed September 18, 1925, bushed flexible couplings, that is contains subject matter taken therefrom, relates especially to bushings for use in machine parts where it is desired to bush an aperture in an easily and simply applied manner, and where if necessary it is also easy to remove the bushings. These machine parts may be of almost any usual type such as a flexible coupling or other device, and for either the aperture may be at the end of a bar in an eye form, or the part which is to be bushed may be in the side of a member or in some other part of a member for transmitting motion in some specified direction, or the bushing may support a shaft in rotary motion. These members may be of flanged form, or they may be of any other shape having a hole which requires the bushings. The machine part may be of almost any material of construction such as cast iron, steel, aluminum, wood, hard rubber, bakelite, or any other usual or unusual material of machine parts. The bushings may also be of any material ordinarily used in machine construction, although in many cases brass, bronze, steel or graphited metallic bushings will be the preferred ones because the bushings are more easily fabricated of such materials. After the hole in the machine part is made by drilling or some other method then the bushing is inserted in the hole and accurately, conveniently and removably fastened in the hole by driving through the intersecting hole of the part and the bushing with a punch or die to swell out the bushing wall opposite the entrance of the intersecting hole into the end portion of the intersecting hole of the machine part. While the bushing used will ordinarily be used in a round hole, it is of course evident that the special bushing with the locking means might also be used in a rectangular or some other form of hole by making the bushings of the proper form or shape to correspond. It is also evident that the use of a bushing in a hole is not new, but my bushing with the special means of applying and fastening in place and then later removing if necessary is simpler and less expensive where this form of connection is desired. By the use of this form of bushing I eliminate some careful and expensive machine work such as the necessity of pressure fits. The hole in the machine part in which it is desired to insert and fasten my bushing has another smaller intersecting hole bored approximately at right angles to the axis of the hole to be bushed. This intersecting hole enters the hole to be bushed at a convenient position, and on the opposite side of the hole to be bushed this smaller intersecting hole extends into the machine part only a small way. The bushing has a corresponding intersecting hole drilled approximately at right angle to the axis of the bushing. The inner end of this intersecting hole may not touch the opposite wall of the bushing, or it may go part way through the wall of the bushing or if desired it may go far enough through the bushing wall to open through to the outside. In use this bushing is inserted in the hole to be bushed with the intersecting hole of the bushing matching up with the intersecting hole in the part to be bushed and then I insert a drift or punch through these intersecting holes and drive this against the opposite wall so as to swell out the opposite wall of the bushing into the end of the intersecting hole in the machine part. This swelled projecting portion locks the bushing firmly in place. When it is desired to remove the bushing I insert a drill into the same or matching intersecting holes and against the swelled out portion of the bushing wall on the opposite side. I then drill out the swelled out portion and the bushing is then free to be pushed out of the hole. It will thus be seen that by the use of my special bushing I am enabled to firmly and definitely locate the bushing in the hole to be bushed without expensive machine operations, and that the bushings may be renewed in the field without any unusual or special tools, and that a new bushing may be inserted in the manner described also without the use of any special tools, or pressure fits, or the use of collars or screws.

In the accompanying drawing showing in a somewhat diagrammatic way a number of illustrative embodiments of this invention.

Fig. 1 is a longitudinal section of a machine part showing the bushing embodying this invention.

Fig. 2 is a sectional view of another machine part which has the intersecting hole drilled and which is ready for the bushing as described by this invention.

Fig. 3 is a sectional view of the bushing such as described.

Figs. 4, 5 and 6 show somewhat different styles of bushings all having the intersecting holes.

Fig. 7 shows a machine part prepared as in Fig. 2 with the bushing inserted in place and the punch in place in the intersecting holes ready to punch the metal of the bushing into the end of the intersecting hole in the part.

Fig. 8 shows the bushing and part of Fig. 7 after the bushing wall has been swelled out and the punch removed.

Fig. 9 is a sectional view of a machine part and bushing in somewhat different position and the bushing located by swelling out the metal into the intersecting hole.

Fig. 10 is an end view of still another machine part with the bushing located toward the side and the bushing locked in place by swelling out the metal into the intersecting hole.

My bushing applied in a machine part is shown in Fig. 1 as comprising the machine part to be bushed 1, and in the machine part to be bushed 1 is drilled or otherwise made the hole to be bushed 3 in which is inserted the bushing 4. The hole 3 to be bushed is provided with an intersecting hole 5 in the machine part 1 and the bushing 4 is also provided with an intersecting hole 6. The intersecting hole 5 in the machine part is continued across the hole 3 to be bushed so that the end 7 of the intersecting hole in the machine part enters a small way into the machine part on the opposite side of the hole 3 from the entrance of the intersecting hole 5. When the bushing is in place a punch is put in through the matching intersecting holes 5 and 6 and pressed against the opposite wall of the bushing to swell out a portion forming the punched in metal 8 which projects into the end 7 of the intersecting hole in the machine part. The main hole 9 in the bushing 4 is then ready for the application of the connecting pin, or shaft or other member not shown, for use in the usual manner where bushings are used. It will be seen that when the bushings become worn or otherwise damaged they may be easily removed by inserting a drill through the matching intersecting holes 5 and 6 against the punched in metal 8 and drilling out the punched in metal 8 so that the projecting metal no longer locks the bushing 4 in place by projecting in the end 7 of the intersecting hole 5. After the drill is removed the old bushing 4 can then be pushed out of place and then a new bushing can be inserted as just described.

Fig. 2 shows in section a machine part prepared for the use of one of my bushings. The faces 10—11 of the machined part to be bushed may if desired be smooth and parallel and between them is the hole 3 to be bushed. Entering the hole 3 to be bushed is the intersecting hole 5 which is formed by drilling or other process and this same intersecting hole 5 is extended across the main hole 3 so that the end 7 of the intersecting hole 5 projects slightly into the opposite wall of the machine part 1 to be bushed.

Fig. 3 shows the bushing 4 before it is applied to the part to be bushed. In this case the intersecting hole 6 does not extend clear through or across the main hole 9 of the bushing as it will be seen that the opposite wall of the bushing is not intersected by the intersecting hole.

Fig. 4 shows a bushing similar to Fig. 3 with the exception that the bushing 12 has the intersecting hole 6 extended clear across the main hole so that it intersects the opposite bushing wall 15 with the end 14 of the intersecting hole 6 at the place shown.

Fig. 5 shows still another form of bushing 13 which is generally similar to that shown in Fig. 4 excepting that in this case the bushing has a closed end 16 which is part of the bushing 13. In this case also the intersecting hole 6 extends clear across the main hole of the bushing to intersect the bushing wall 15 by the end 14 of the intersecting hole 6.

Fig. 6 shows another similar bushing 17 which has the intersecting hole 6 extended clear across the main hole of the bushing so that it intersects the bushing wall 15 by the end 18 of the intersecting hole 6 and in this case the intersecting hole carried far enough, by drilling if desired, so that the opening 19 is made through the bushing wall 15 by the end 18 of the intersecting hole 6. This form of hole may if desired be used where the metals to be handled are specially thick and tough and it becomes desirable to make the bushing wall 15 easier to swell out than if the wall were of the full thickness.

Fig. 7 shows a machine part prepared as in Fig. 2 with the bushings such as in Fig. 4 inserted in place and then the drift or punch 20 inserted through the intersecting holes 5 and 6 to bear against the bushing wall at the end 14 of the intersecting hole in the bushing. In this case the end 21 of the punch is shown seated in the slight depression caused by the end 14 of the intersecting hole in the bushing. The bushing is shown in place in the machine part all ready for the application of the force by the punch 20.

Fig. 8 shows the machine part and bushing of Fig. 7 after the punch has been properly used to swell out the bushing wall and form the punched in metal 8 which projects into the intersecting hole end 7 in the machine part. This bushing as can be seen will be held in a definite position by this punched in metal 8. When it is desired to renew this or similar bushings then an ordinary drill is inserted through the matching intersecting holes 5 and 6 against the punched in metal 8 and this punched in metal is drilled out of place. The bushing then loses the swelled out portion and may be easily moved out of place.

Fig. 9 shows the application of a similar bushing as in Fig. 8 except that it is applied to a hole in the machine part which has a closed inner end. In this case the bushing 23 is inserted in the hole 22 to be bushed so that the intersecting hole 5 in the machine part matches up with the intersecting hole 6 in the bushing and then the same process of using punch is applied to swell out the punched in metal 8 in the end 7 of the intersecting hole 5 in the machine part 24.

Fig. 10 shows the end view of a bushing 4 applied in a hole 3 to be bushed in a machine part 25. As in the previous figures the punched in metal 8 projects into the intersecting hole end 7 to locate the bushing 4 from turning or moving to any considerable amount in the hole 3 to be bushed.

This invention has been described in connection with a number of illustrative embodiments, forms, proportions, sizes, materials, numbers and arrangements of parts and methods of manufacture and use, to the details of which disclosure the invention is not of course to be limited since what is claimed as new and what is desired to be secured by Letters Patent is set forth in the appended claims.

1. A one piece unhardened bushing having an intersecting hole through its wall, said hole being at an angle to the major axis of the bushing, the end of the intersecting hole extending into the opposite wall of the bushing approximately opposite the entrance of the intersecting hole, and the bushing wall opposite the entrance of the intersecting hole being adapted to be forced out to form a securing member for the bushing, and the bushing wall approximately opposite the entrance of the intersecting hole bent outward away from the entrance of the intersecting hole.

2. A one piece unhardened bushing having an intersecting hole through its wall, said hole being at an angle to the major axis of the bushing, the end of the intersecting hole extending into the opposite wall of the bushing approximately opposite the entrance of the intersecting hole, and the bushing wall opposite the entrance of the intersecting hole being adapted to be forced out to form a securing member for the bushing.

3. A one piece unhardened bushing having an intersecting hole through its wall, said hole being at an angle to the major axis of the bushing, the end of the intersecting hole extending into the opposite wall of the bushing approximately opposite the entrance of the intersecting hole, and the bushing wall approximately opposite the entrance of the intersecting hole bent outward away from the entrance of the intersecting hole.

4. An unhardened bushing having an intersecting hole through its wall, said hole being at an angle to the major axis of the bushing, the end of the intersecting hole extending into the opposite wall of the bushing approximately opposite the entrance of the intersecting hole.

5. An unhardened bushing having an intersecting hole through its wall, said hole being at an angle to the major axis of the bushing, and the bushing wall opposite the entrance of the intersecting hole being adapted to be forced out to form a securing member for the bushing, and the bushing wall approximately opposite the entrance of the intersecting hole bent outward away from the entrance of the intersecting hole.

6. An unhardened bushing having an intersecting hole through its wall, said hole being at an angle to the major axis of the bushing, and the bushing wall opposite the entrance of the intersecting hole being adapted to be forced out to form a securing member for the bushing.

7. An unhardened bushing having an intersecting hole through its wall, said hole being at an angle to the major axis of the bushing, and the bushing wall approximately opposite the entrance of the intersecting hole bent outward away from the entrance of the intersecting hole.

8. The machine part comprising a member having a hole, said hole in the part bushed with an unhardened bushing, said bushing having an intersecting hole at an angle to the axis of the bushing, said hole in said part having an intersecting hole matching approximately with the intersecting hole of the corresponding bushing, and the bushing wall approximately opposite the entrance of the intersecting hole swelled into the end of the matching intersecting hole in the part to form an integral retaining portion, to firmly and renewably hold the bushing from coming out of the part.

9. The machine part comprising a member having a hole, said hole in the part bushed with an unhardened bushing, said bushing having an intersecting hole at an angle to the axis of the bushing, said hole in said part having an intersecting hole matching approximately with the intersecting hole of the corresponding bushing, and the bushing wall approximately opposite the entrance of the intersecting hole swelled into the end of the matching intersecting hole in the part to form an integral retaining portion.

10. The machine part comprising a member having a hole, said hole in the part bushed with an unhardened bushing, said bushing having an intersecting hole at an angle to the axis of the bushing, said hole in said part having an intersecting hole matching approximately with the intersecting hole of the corresponding bushing and the bushing wall approximately opposite the entrance of the intersecting hole swelled into the end of the matching intersecting hole in the part.

11. The machine part comprising a member having a hole, said hole in the part bushed with an unhardened bushing, said bushing having an intersecting hole at an angle to the axis of the bushing, said hole in said part having an intersecting hole matching approximately with the intersecting hole of the corresponding bushing and the intersecting hole in the part extending into the opposite wall of the hole in the part approximately opposite the entrance of the intersecting hole.

ROBERT A. SMITH.